C. J. COLEMAN.
MOTION PICTURE FILM.
APPLICATION FILED MAR. 20, 1912.
1,293,040.
Patented Feb. 4, 1919.
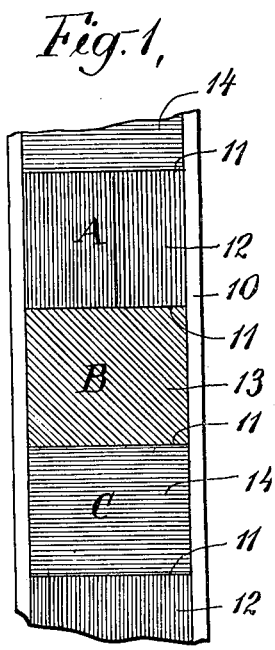
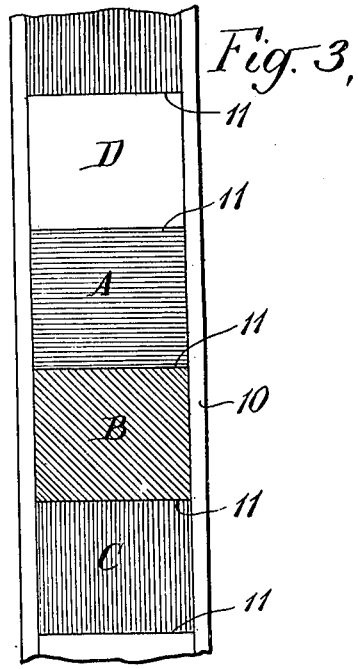
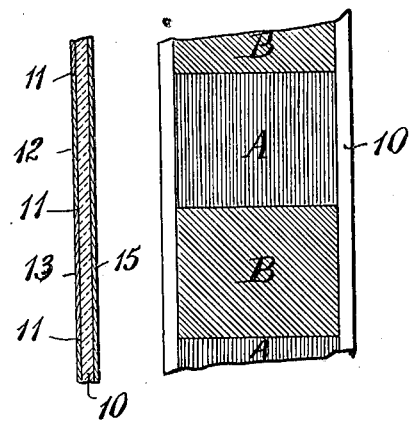
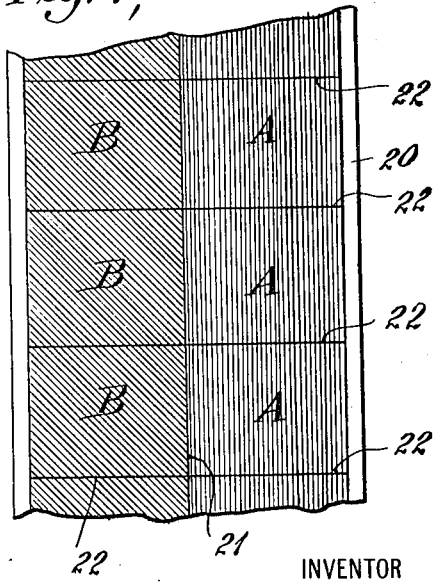
WITNESSES:
INVENTOR
Clyde J. Coleman
BY
Kenyon & Kenyon
ATTORNEYS

UNITED STATES PATENT OFFICE.

CLYDE J. COLEMAN, OF NEW YORK, N. Y.

MOTION-PICTURE FILM.

1,293,040.	Specification of Letters Patent.	Patented Feb. 4, 1919.

Application filed March 20, 1912. Serial No. 685,036.

*To all whom it may concern:*

Be it known that I, CLYDE J. COLEMAN, a citizen of the United States, and a resident of the city of New York, county and State of New York, have invented certain new and useful Improvements in Motion-Picture Films, of which the following is a specification.

My invention relates to improvements in motion picture film strips, and more particularly to a motion picture film strip adapted to produce colored moving pictures.

One object of my invention is to provide an arrangement by which colored moving pictures may be produced with the ordinary cameras and projectors now common, and without any or any material alteration thereof. A further object of my invention is to provide an arrangement which in case the film strip becomes broken and is again patched with the omission of one or more of the individual pictures, it does not and cannot get out of synchronism. A further object of my invention is to provide an arrangement in which the "whites" may be more clearly brought out when desired, and which is simple and easy to manufacture, and efficient in operation.

Further objects, features and advantages will more clearly appear from the detailed description given below taken in connection with the accompanying drawings which form a part of this specification.

Referring to the drawings, Figure 1 illustrates a section of a moving picture film strip provided with my improvements in one form.

Fig. 2 is a similar section showing a modified form.

Fig. 3 is a similar section showing still another modified form.

Fig. 4 is a similar section showing a still further modified form.

Fig. 5 is a transverse lengthwise section, somewhat exaggerated, illustrating one embodiment of my improved film strip.

According to a well known method of producing colored moving pictures of things in motion, in the taking of the pictures a screen is rotated in front of the film, said screen being divided into two or three parts, each part colored with a different primary color so as to transmit the rays of that color and exclude the rays of the other color or colors. By this method one picture of the strip is taken with the rays of one of the primary colors, the other rays being excluded, and the next picture is taken with the rays of the second primary color, the other rays being excluded, and so on.

In projecting, a similar shutter or screen is synchronously rotated in front of the film in order that each image on the film may be thrown on the screen with its proper color. One disadvantage of such an arrangement is that in case the film becomes broken or torn and is again patched, in the patching one or more of the pictures is often omitted, and in such case it will be apparent that the rotating screen may be thrown out of synchronism with the intermittent movements of the film, which would be, of course, fatal to the results desired. A further disadvantage of such an arrangement is that it requires a specially constructed rotating screen in every machine used.

Referring to the drawings, in my improved arrangement for producing colored moving pictures of things in motion, I take the usual film strip 10 and if the strip is to be used for taking the pictures, in the first instance I color the spaces consecutively in rotation with two or more different primary colors.

As shown in Fig. 1, the boundary lines of each picture on the strip 10 are indicated at 11, and a portion of the film, in the present case that portion occupied by one of the pictures, is colored red, as at 12. The next consecutive portion, corresponding in the present case to the next picture, at 13, is colored green, while the next consecutive portion, in the present case that portion occupied by the next picture, at 14, is colored blue, and so on. Such a strip may be formed by taking the usual celluloid strip 10 and placing the sensitive coating 15 on one side thereof, and placing on the opposite side of the strip coatings of red coloring material at 12, green coloring material at 13, and so on, as illustrated in Fig. 5.

It will be understood that these colored coatings of three primary colors are transparent, thus allowing light rays of the respective colors to pass therethrough, so that the image or picture at A will be one produced only by the red rays of the object, the picture B will be one produced only by the green rays of the object, and the picture C will be one produced only by the blue rays of the object, and so on. It has been found, however, that satisfactory results may be obtained by using only two of the primary colors, and in such case I provide a film strip, as shown in Fig. 2, in which the portion at A is colored red and the portion at B is colored green, or a greenish blue. After producing the negative in this manner the film is developed and a positive produced in the usual manner either by transmitting the light rays through the colored coatings or by first removing the colored coatings, and then printing. The positive film strips are then colored in exactly the same manner and with substantially the same colors as the negative strips, so that on suitable projection only the red rays will be transmitted through the portion A, green rays through the portion B, and blue rays through the portion C, and so on, so that a composite colored picture will be produced.

In actual projection it is found that the red, green and blue images, or the red and green-blue images, which are thus produced consecutively on the screen are produced so quickly after one another that they appear superposed to the eye of the observer, so that by the combination of the two or three the necessary whites of the picture and other composite colors are produced. It is found however, that in many cases the whites are not strong or pure enough, and in order to accentuate the whites when desired I provide a film strip, as shown in Fig. 3, in which of every four pictures or picture spaces one picture is left uncolored, as at D, so that during the taking and projection of this picture, light rays of all colors may be transmitted through the film.

In the present instance, I have shown the division lines or boundaries 11 of the various pictures or picture spaces as being the boundaries of the different colored portions, since this is a most simple and convenient way of coloring the film. However, it is not necessary that the different colored portions correspond with the different pictures, and I do not desire that the invention in its broadest aspects be limited to such coincidence of boundaries.

It is better in producing colored moving pictures with my improved arrangement, to operate the film strip at a somewhat greater speed than is ordinarily done, but this may be easily accomplished by the common forms of apparatus without any or any material change. By the arrangement in Fig. 4, I show a film 20 which is adapted to have two pictures side by side thereon, there being a dividing line 21 down the middle of the strip between the same. Dividing lines 22 divide the strip crosswise into consecutive divisions for consecutive pictures of the things in motion. In this strip the pictures or images at AAA, &c., are colored red while the pictures at BBB are colored green or green-blue, so that the sensitive surface of the film behind the portions A have been acted on only by the red rays, to the exclusion of rays of other colors, while the sensitive surfaces behind the portions B have been acted on only by the green or green-blue rays. With such a strip the adjacent pictures A and B are projected simultaneously upon the screen so that the desired composite colored picture is formed, as will be readily understood by those skilled in the art.

With such a film, however, it will be understood that two lenses are required, one for taking pictures A, and one for taking pictures B, and similarly two lenses would be required in a like manner, in projecting.

Although I have described my improvements in great detail and with respect to certain particular embodiments thereof, nevertheless I do not desire to be limited to such details except as clearly pointed out in the appended claims since many changes and modifications may well be made without departing from my invention in its broadest aspects.

Having fully and clearly described my improvements, what I claim as new and desire to secure by Letters Patent is:

1. A moving picture film strip having a photographically sensitive coating on one side thereof and transparent coatings on the other side thereof of two or more primary colors, some parts of the strip having a coating of one color and other parts of another color.

2. A transparent moving picture film strip having a single row of consecutive picture portions, one side of which strip has consecutive picture portions transparently colored respectively consecutively with two or more primary colors, and the other side of which has a photographically sensitized surface.

3. A moving picture film strip having on one side thereof a photographically sensitive coating and on the other side a transparent coating of one or more colors arranged to correspond with the consecutive picture portions.

4. A moving picture film strip having on one side the base a photographically sensitive coating and on the other side of the base a transparent layer of one or more colors arranged to correspond with the consecutive picture portions.

In testimony whereof, I have signed my name to this specification, in the presence of two subscribing witnesses.

CLYDE J. COLEMAN.

Witnesses:
 GORHAM CROSBY,
 EDWIN SEGER.